US012734788B2

(12) United States Patent
Keller et al.

(10) Patent No.: US 12,734,788 B2
(45) Date of Patent: Sep. 15, 2026

(54) LAMINATED GLASS COMPRISING AN INTERLAYER FILM WITH INK APPLIED THEREON

(71) Applicant: KURARAY EUROPE GMBH, Hattersheim am Main (DE)

(72) Inventors: Uwe Keller, Avon (FR); Florian Mummy, Frankfurt am Main (DE); Bastian Ebeling, Troisdorf (DE)

(73) Assignee: KURARAY EUROPE GMBH, Hattersheim am Main (DE)

( * ) Notice: Subject to any disclaimer, the term of this patent is extended or adjusted under 35 U.S.C. 154(b) by 751 days.

(21) Appl. No.: 17/627,009

(22) PCT Filed: Jul. 9, 2020

(86) PCT No.: PCT/EP2020/069389

§ 371 (c)(1),
(2) Date: Jan. 13, 2022

(87) PCT Pub. No.: WO2021/008999

PCT Pub. Date: Jan. 21, 2021

(65) Prior Publication Data

US 2022/0363037 A1 Nov. 17, 2022

(30) Foreign Application Priority Data

Jul. 18, 2019 (EP) .................................... 19187109

(51) Int. Cl.
*B32B 3/10* (2006.01)
*B32B 17/10* (2006.01)
*B32B 27/08* (2006.01)
*B32B 27/22* (2006.01)
*B32B 27/30* (2006.01)
(Continued)

(52) U.S. Cl.
CPC .. *B32B 17/10275* (2013.01); *B32B 17/10036* (2013.01); *B32B 17/10605* (2013.01); *B32B 17/10761* (2013.01); *B32B 17/10935* (2013.01); *B32B 27/08* (2013.01); *B32B 27/22* (2013.01); *B32B 27/306* (2013.01); *C08J 5/18* (2013.01); *C09D 11/037* (2013.01); *C09D 11/107* (2013.01); *B32B 2307/4023* (2013.01); *B32B 2605/006* (2013.01); *C08J 2329/14* (2013.01)

(58) Field of Classification Search
None
See application file for complete search history.

(56) References Cited

FOREIGN PATENT DOCUMENTS

EP 2883694 A1 * 6/2015 ....... B32B 17/10036
JP 2016069629 A 5/2016
(Continued)

OTHER PUBLICATIONS

Dye Ink vs. Pigment Ink: Understanding the Differences and Choosing the Right Ink for Your Printing Needs, SplashJet Ink, 2 (Sep. 1, 2023) https://splashjet-ink.com/dye-ink-vs-pigemnt-ink-the-differences/ (accessed Oct. 24, 2025).*
(Continued)

*Primary Examiner* — Christopher M Polley
(74) *Attorney, Agent, or Firm* — Brooks Kushman P.C.

(57) ABSTRACT

Laminated glass having two glass sheets are laminated by an adhesive interlayer film with specific inks having a pH≥7 applied to at least one side of the interlayer.

19 Claims, 1 Drawing Sheet

(51) Int. Cl.

| | |
|---|---|
| ***C08J 5/18*** | (2006.01) |
| ***C09D 11/037*** | (2014.01) |
| ***C09D 11/107*** | (2014.01) |

(56) References Cited

FOREIGN PATENT DOCUMENTS

| | | | |
|---|---|---|---|
| WO | 03033583 | A1 | 4/2003 |
| WO | 2019038043 | A1 | 2/2019 |

OTHER PUBLICATIONS

International Search Report dated Sep. 1, 2020 for PCT Application No. PCT/EP2020/069389, filed Jul. 9, 2020.

* cited by examiner

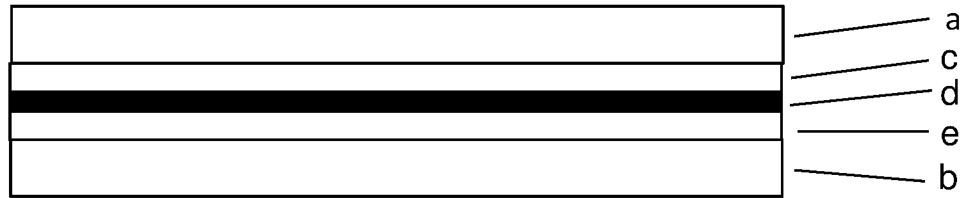
a
c
d
e
b

LAMINATED GLASS COMPRISING AN INTERLAYER FILM WITH INK APPLIED THEREON

CROSS REFERENCE TO RELATED APPLICATIONS

This application is the U.S. National Phase of PCT Appln. No. PCT/EP2020/069389 filed Jul. 9, 2020, which claims priority to European Application No. EP 19187109.4 filed Jul. 18, 2019, the disclosures of which are incorporated in their entirety by reference herein.

BACKGROUND OF THE INVENTION

1. Field of the Invention

The present invention relates to laminated glass comprising two glass sheets combined by an adhesive interlayer film with a specific ink applied to at least one side of the interlayer.

2. Description of the Related Art

Laminated glass has advantageous features like penetration resistance and retention of shards after breakage and is used in many applications in the automotive and the architectural industry. Polyvinyl acetals and especially polyvinyl butyral (PVB) is a frequently used material for the interlayers of the laminates.

In the architectural industry, glazing in different colors is experiencing an increasing demand, especially for decorative purposes and shading against excessive sunlight. Currently, pigments are blended into the PVB and then co-extruded to yield colored PVB films. This technique has certain disadvantages. For example, the PVB film manufacturers need to separately blend the PVB resin with each individual color, then extrude the individual colored films and afterwards, and clean the complete production line to remove traces of the pigments before using it for clear films or films of other colors. Due to the large possible number of different colors and an increasing demand for specific colors, e.g. colors of a specific corporate design, film manufacturers have to produce a large number of different colors and store them—most of them in cold storage conditions—until sale. As a solution to this problem it is known to stack several sheets of PVB films extruded with different basic colors to create a laminate with a certain color. However, applying several layers of basic colors can lead to an unacceptable thickness of the glass laminate. Moreover, the stacking of different colored PVB layers can lead to undesired optical distortion effects and to problems in the de-aeration process prior to the lamination step.

In the automotive industry, at least one of the two glass sheets in a windshield is usually provided with a non-transparent frame to protect the sealant or the adhesive which mechanically connects the windshield with the chassis from UV radiation. In certain cases, the other glass sheet is provided with such a non-transparent frame in order to hide the electrical connections from view.

The current standard process in the industry is using sintering enamels on one of the glass surfaces, which is associated with several disadvantages due to the high processing temperature. WO 2019/038043 A1 describes laminated glass with a non-transparent region which is coated or printed onto a PVB interlayer film using an ink.

However, it has now surprisingly been found that many commercially available inks have certain drawbacks in the lamination process as their application to the interlayer films can lead to problems with the adhesion between the glass sheets and the interlayers and/or to incompatibility with the polyvinyl acetal interlayer material.

Thus, object of the present invention was an improved laminated glass using a more economic process, e.g. in terms of time and/or cost, a more flexible process and/or a laminated glass with improved properties, especially with an improved adhesion.

SUMMARY OF THE INVENTION

The foregoing problems and other problems have been solved by the present invention, wherein glass laminates are prepared by laminating glass panes with a polyvinyl acetal film optionally containing a plasticizer, and the polyvinyl acetal film is printed on at least one surface with an ink having a pH of 7 or more.

BRIEF DESCRIPTION OF THE DRAWING

FIG. 1 illustrates a preferred embodiment of a laminated glass structure of the invention with a and b referring to the two glass sheets, c referring to film A, d referring to the surface region of film A where the ink is applied and e referring to the optional film B.

DETAILED DESCRIPTION OF THE PREFERRED EMBODIMENTS

The present invention thus pertains to a laminated glass obtained by laminating at least one film A comprising a polyvinyl acetal PA and optionally at least one plasticiser WA between two glass sheets, characterized in that film A comprises at least on one surface a region where an ink is applied to the surface wherein prior to its application, the pH value of the ink is equal to or higher than 7. Preferably, the pH of the ink is >7.5, more preferably >8.0, even more preferably >8.5. Also preferably, the pH of the ink is from 7 to 12, more preferably from 7.5 to 10, and most preferably from 8 to 9.

The pH value is determined by standard method DIN 19268:2007-05.

The present invention also provides laminated glass obtained by laminating at least one film A comprising a polyvinyl acetal PA and optionally at least one plasticiser WA between two glass sheets, characterized in that film A comprises at least on one surface a region where an ink is applied to the surface wherein prior to its application the concentration of potassium, magnesium or calcium ions in the ink is equal to or lower than 200 mg/l.

The concentration of the ions is determined by inductively coupled plasma atomic emission spectroscopy following sample preparation by way of microwave digestion according to EPA Method 3052.

In the context of the invention, the concentration of components in the ink are given as concentrations prior to the application of the ink to the surface of film A. Thus, the term "prior to its application" refers to the state of the ink before it is applied to the at least one surface of film A.

Preferably, the laminated glass further comprises at least one film B comprising a polyvinyl acetal PB and at least one plasticiser WB between two glass sheets wherein the at least one surface of film A, to which the ink is applied, is facing film B. Thus, the ink is not in direct contact to the glass sheets in order to reduce possible problems with adhesion between the ink and the glass surface.

Surprisingly, it has been found by the present inventors that certain components of commercially available inks interfere with the adhesion between the polyvinyl acetal interlayers and the glass surface, even in cases where the surface on which the ink is applied is not in direct contact with the glass surface, e.g. in cases where the ink is applied to a surface which is in contact with another polyvinyl acetal surface, specifically when the ink is sandwiched between a film A and a film B. Without wishing to be bound by theory, it is believed that those components from the ink interfering with the adhesion migrate through the polyvinyl acetal to the glass surface. Such a diffusion process is assumed to be facilitated by low amounts of molecules such as certain organic acids generated in small amounts through hydrolysis of plasticizer molecules. For example, if film A and film B contain different amounts of plasticizer, the amount of plasticiser will equilibrate during and after lamination. It is believed that this migration of plasticizer and its cleavage products assists in the diffusion of ink components affecting the adhesion.

Ions of alkali and alkaline earth elements, particularly calcium, magnesium and potassium salts, are known to have a high influence on the adhesion between glass surface and polyvinyl acetal films. On the other hand, many commercially available inks contain rather high amounts of ions of alkali and/or alkali earth elements. The ions are either introduced on purpose, e.g. as counter ions of components of the ink, or unintentionally as impurities in one of the components, e.g. as an ion load of the water used as main solvent in water-based inks.

Using an ink with a concentration of these cations equal to or less than 200 mg/l leads to improved adhesion. Preferably, the concentration of potassium, magnesium and calcium ions in the ink is equal to or lower than 200 mg/l, more preferably equal to or lower than 100 mg/l, even more preferably equal to or lower than 50 mg/l, and specifically equal to or lower than 10 mg/l. For potassium, the concentration in the ink is preferably equal to or below 20 mg/l, more preferably equal to or below 10 mg/l and especially equal to or below 2.5 mg/l. For magnesium, the concentration in the ink is preferably equal to or below 50 mg/l, more preferably equal to or below 25 mg/l and especially equal to or below 10 mg/l. For calcium, the concentration in the ink is preferably equal to or below 250 mg/l, more preferably equal to or below 100 mg/l and most preferably equal to or below 50 mg/l and especially equal to or below 10 mg/l.

There is no lower limit of the concentration of these ions in the ink apart from the lowest concentration which is technically achievable.

The inks according to the present invention are either in liquid or paste form and contain pigments and/or dyes. Suitable pigments and dyes include carbon black, iron oxides, spinel pigments, organic color pigments or dyes like diazo dyes, phthalocyanines, perylenes, anthraquinones, anthrapyrimidines, quinophthalone, perinones, quinacridones, diketopyrrolopyroles, monoazo dyes, for example Thermoplastrot 454, Macrolexgelb G, Sandoplast Rot G or Solvaperm Rot G, and/or inorganic pigments, for example zinc chromate, cadmium sulphide, chromium oxide, ultramarine pigments, metal flakes, barium sulfate, and titanium oxide.

Preferably, the ink according to the present invention is a water-based ink. Water-based printing inks are preferred over printing inks based on organic solvents since they do not swell or dissolve the film A, which could lead to film defects.

The term "water-based ink" refers to any ink which uses water as a solvent base.

In case of water-based inks, it is especially preferred to use an ink which is produced with deionized water (DI water), i.e. water that has almost all of its ions removed.

However, using an ink produced with de-ionized water can lead to degradation of the polyvinyl acetal films, especially if the ink-bearing film is subject to high temperatures over extended periods of time as will especially be the case when the ink provides a high degree of light absorption. It is believed that such degradation is caused by residual acidity of the de-ionized water which could lead to hydrolysis of the acetal groups. Distilled water dissolves carbon dioxide from air to form carbonic acid. For instance, absorption of carbon dioxide can cause the pH of ultra-pure water to drop to 4.5.

Thus, it is preferred to control the pH of the ink. Examples of pH control agents include alkanolamines such as mono-, di- and triethanolamine, sodium hydroxide and lithium hydroxide.

Water-based inks according to the present invention can optionally contain a water-miscible organic solvent. Examples of the water-miscible organic solvent include alkyl alcohols having 1 to 4 carbon atoms such as methyl alcohol, ethyl alcohol, n-propyl alcohol, isopropyl alcohol, n-butyl alcohol, sec-butyl alcohol and isobutyl alcohol; ketones or ketone alcohols such as acetone and diacetone alcohol; ethers such as tetrahydrofuran (THF) and dioxane; alkylene glycols such as ethylene glycol, propylene glycol, diethylene glycol and triethylene glycol; polyalkylene glycols such as polyethylene glycol and polypropylene glycol; lower alkyl ethers of polyhydric alcohols, such as ethylene glycol monoethyl ether, propylene glycol monomethyl ether, diethylene glycol monoethyl ether and triethylene glycol monoethyl ether; lower alkyl ether acetates such as polyethylene glycol monomethyl ether acetate; glycerol; and pyrrolidones such as 2-methylpyrrolidone and N-methyl-2-pyrrolidone. Glycols are especially preferred. The amount of these organic solvents is not specifically limited, but is generally within a range of 1 to 50% by weight, preferably 2 to 10% by weight.

Furthermore, the water-based ink according to the present invention can optionally contain a water-soluble resin, e.g. a low condensate of vinyl pyrrolidone, a water-soluble acrylic resin, an alcohol-soluble resin, e.g. a phenol resin, an acrylic resin, a styrene-maleic resin, a poly urethane resin, a polyvinyl acetal resin, a polyvinyl alcohol resin or ketone resin. Preferred are polyvinyl acetal, especially PVB resins. The amount of these resins is not specifically limited, but is generally within a range of 10 to 50% by weight, preferably 20 to 30% by weight.

It is especially preferred to use an ink with a low concentration of potassium, magnesium and calcium ions as well as a pH equal to or higher than 7.

Especially in automotive applications, the ink according to the invention is preferably black and the laminated glass is non-transparent in the region where the ink is applied to the surface of film A. Also preferably, the ink has a color other than black and the laminated glass is non-transparent in the region where the ink is applied to the surface of film A.

Especially in architectural applications, the ink has a color other than black and the laminated glass is transparent in the region where the ink is applied to the surface of film A.

Alternatively, the ink has a color other than black and the laminated glass is non-transparent in the region where the ink is applied to the surface of film A.

The term "color" is intended to denote that the surface appears in a color other than black and the color of standard commercial-grade PVB, which has not been modified with the purpose to display a specific color. The color can be chosen from any possible color of the visible light spectrum as a single color or as a mixture of different colors. Furthermore, "color" shall also refer to a a metallic effect, a white region or to a region in any possible shade of grey.

The term "non-transparent" refers to any region of the film having a light transmission in the visible spectrum of equal to or less than 5%. The term "transparent" refers to any region of the film having a light transmission in the visible spectrum of more than %. In a variant, the "non-transparent region" may fade out towards transparency. In such variants, at least a part of the "non-transparent region" of the film has a light transmission in the visible spectrum of less than 5%.

The non-transparent region can be completely opaque and/or in part interrupted and/or have a transition area from a completely opaque edge into the transparent area. Interrupted printing may be achieved in form of dotted patterns. The non-transparent region may continuously fade-in from transparent to opaque black or grey.

The shape of the non-transparent region may be rectangular or follow the contour of the finished laminated glass.

The inks can be applied via techniques that are commonly known in the printing industry such as offset printing, rotogravure printing, flexography, and screen-printing, followed usually by a drying step. Preferably, more than one ink layers are superimposed onto each other. Also preferably, the superimposition is done after drying the preceding ink layer at least partially.

In order to avoid wrinkling and or deformation of film A due to excessive heating in a drying step, it is crucial, that film A will not be exposed to temperatures above its glass transition temperature measurable as Tg by the DSC method. It is thus preferred that the temperature of film A during the drying step is kept below Tg of the film by at least 3° C. or at least 5° C. or at least 10° C. or at least 15° C. or most preferably at least by 20° C.

The dry-film thickness of the ink layers in the printed area is between 0.5-50 μm depending on printing technique and required opacity. Usually the dry-film thickness is between 1-30 μm and preferably between 2 and 20 μm. In case more than one ink layer are superimposed, the dry-film thickness refers to the total thickness of the superimposed layers.

The thickness of a film A in the starting state prior to lamination is 10-250 μm, preferably 20-160 μm, more preferably 30-120 μm, yet more preferably 40-100 μm, and most preferably 50-80 μm. This range of thickness does not include additional coating and ink layers on the films. In the laminated glass, the thickness of the film can increase by transfer of plasticiser from film B.

Film A is produced separately from film B (for example extruded or solvent cast) and has either no plasticiser at all or sufficiently small proportion of plasticiser so that subsequent functionalization and processing is not adversely influenced.

Film B may be any plasticized PVB-film known in the art. The films A and B may contain, in the starting state prior to lamination and/or in a stack prepared for lamination between glass sheets, a single plasticiser as well as mixtures of plasticisers both of different and identical composition. The term "different composition" refers to both the type of plasticiser and proportion thereof in the mixture. Film A and film B after lamination, i.e. in the finished laminated glass, preferably have the same plasticisers WA and WB. In a preferred variant, film A in its starting state, however, does not contain any plasticiser and after lamination contains plasticiser WB in equilibrium amount.

Plasticiser-comprising films B used in accordance with the invention contain, in the starting state prior to lamination, at least 22% by weight, such as 22.0-45.0% by weight, preferably 25.0-32.0% by weight and in particular 26.0-30.0% by weight plasticiser.

Films A used in accordance with the invention may contain, in the starting state prior to lamination, less than 22% by weight (such as 21.9% by weight), less than 18% by weight less than 16% by weight, less than 12% by weight, less than 8% by weight, less than 4% by weight, less than 2% by weight, less than 1% by weight or even no plasticiser (0% by weight). In a preferred embodiment of the invention, films A with a low plasticiser content preferably contain 0-8% by weight of plasticiser, most preferably 0-4 by weight %.

Also preferably, the laminated glass according to the invention comprises, prior to lamination, an amount of plasticiser WA in film A of less than 22% by weight and an amount of plasticiser WB in film B of at least 22% by weight. More preferably, prior to lamination the amount of plasticiser WA in film A is less than % by weight, specifically film A contains no intentionally added plasticizer.

The term "prior to lamination" refers to the state of the films A and B prior to having any contact to each other. For example, the term refers to the composition of each film separately formed and separately wound to individual rolls.

The films A or B preferably contain polyvinyl acetals having a proportion of polyvinyl acetate groups, either identically or differently, of 0.1 to 20 mol %, preferably 0.5 to 3 mol %, or 5 to 8 mol %.

The thickness of film B in the starting state is 450-2500 μm, preferably 600-1000 μm, preferably 700-900 μm. A plurality of films B may be used in the invention, either being stacked on each other or separated by films A.

Polyvinyl Acetal

The films A and B used in accordance with the invention contain polyvinyl acetals, which are produced by acetalisation of polyvinyl alcohol or ethylene vinyl alcohol copolymer.

The films can contain polyvinyl acetals, each having a different polyvinyl alcohol content, degree of acetalisation, residual acetate content, ethylene proportion, molecular weight and/or different chain lengths of the aldehyde of the acetal groups.

In particular, the aldehydes or keto compounds used for the production of the polyvinyl acetals can be linear or branched (that is to say of the "n" or "iso" type) comprising 2 to 10 carbon atoms, which leads to corresponding linear or branched acetal groups. The polyvinyl acetals are referred to accordingly as "polyvinyl (iso)acetals" or "polyvinyl (n)acetals".

The polyvinyl acetal used in accordance with the invention results in particular from the reaction of at least one polyvinyl alcohol with one or more aliphatic unbranched keto-compounds comprising 2 to 10 carbon atoms. To this end, n-butyraldehyde is preferably used and polyvinyl acetal PA and polyvinyl acetal PB are both polyvinyl butyral.

The films A or B preferably contain polyvinyl acetals having a proportion of polyvinyl acetate groups, either identically or differently, of 0.1 to 20 mol %, preferably 0.5 to 3 mol %, or 5 to 8 mol %.

The polyvinyl alcohol content of the polyvinyl acetal PA used in film A may be between 6-26% by weight, 8-24% by weight, 10-22% by weight, 12-21% by weight, 14-20% by weight, 16-19% by weight and preferably between 16 and 21% by weight or 10-16% by weight.

Independent of film A, the polyvinyl alcohol content of the polyvinyl acetals PB used in film B may be between 14-26% by weight, 16-24% by weight, 17-23% by weight and preferably between 18 and 21% by weight.

In a preferred embodiment of the invention, film A comprises a polyvinyl acetal PA with a proportion of vinyl alcohol groups from 6 to 26% by weight and the film B comprises a polyvinyl acetal B with a proportion of vinyl alcohol groups from 14 to 26% by weight.

Plasticizer

Films A and/or B used in accordance with the invention may contain, as plasticiser, one or more compounds selected from the following groups:

- esters of polyvalent aliphatic or aromatic acids, for example dialkyl adipates, such as dihexyl adipate, dioctyl adipate, hexyl cyclohexyl adipate, mixtures of heptyl adipates and nonyl adipates, diisononyl adipate, heptyl nonyl adipate, and esters of adipic acid with cycloaliphatic ester alcohols or ester alcohols comprising ether compounds, dialkyl sebacates, such as dibutyl sebacate, and also esters of sebacic acid with cycloaliphatic ester alcohols or ester alcohols comprising ether compounds, esters of phthalic acid, such as butyl benzyl phthalate or bis-2-butoxyethyl phthalate.
- esters or ethers of polyvalent aliphatic or aromatic alcohols or oligo ether glycols with one or more unbranched or branched aliphatic or aromatic substituents, for example esters of glycerol, diglycols, triglycols or tetraglycols with linear or branched aliphatic or cycloaliphatic carboxylic acids; Examples of the latter group include diethylene glycol-bis-(2-ethyl hexanoate), triethylene glycol-bis-(2-ethyl hexanoate), triethylene glycol-bis-(2-ethyl butanoate), tetraethylene glycol-bis-n-heptanoate, triethylene glycol-bis-n-heptanoate, triethylene glycol-bis-n-hexanoate, tetraethylene glycol dimethyl ether and/or dipropylene glycol benzoate
- phosphates with aliphatic or aromatic ester alcohols, such as tris(2-ethylhexyl)phosphate (TOF), triethyl phosphate, diphenyl-2-ethylhexyl phosphate, and/or tricresyl phosphate
- esters of citric acid, succinic acid and/or fumaric acid.

By definition, plasticisers are organic liquids having a high boiling point. For this reason, further types of organic liquids having a boiling point above 120° C. can also be used as plasticiser.

Films A in the variants in which a plasticiser WA is present in film A in the starting state, and also films B particularly preferably contain 1,2-cyclohexane dicarboxylic acid diisononyl ester (DINCH) or triethylene glycol-bis-2-ethyl hexanoate (3GO or 3G8) as plasticiser.

In addition, films A and B may contain further additives, such as residual quantities of water, UV absorber, antioxidants, adhesion regulators, optical brighteners or fluorescent additives, stabilisers, colorants, processing aids, inorganic or organic nanoparticles, pyrogenic silicic acid and/or surface active substances.

Lamination Process

The present invention also relates to a method for producing the described penetration resistant glass laminates, in which the film A is positioned on a glass sheet, then covered by at least one film B, and a second glass sheet is then applied.

Alternatively, it is possible for film B to be positioned on a glass sheet, then to be covered by at least one film A, and for a second glass sheet to be applied.

The present invention relates furthermore to a method for producing a laminated glass wherein a stack comprising at least one film A and at least one film B is provided, the stack is positioned on a first glass sheet and a second glass sheet is then applied.

It is possible in accordance with the invention to first melt the film A onto a glass sheet over the entire area or locally by increased temperature and to then cover this with the film B. Alternatively, films A and B can be positioned jointly between two glass sheets and melted at increased temperature.

The lamination step for producing a laminated glass is preferably carried out such that films A and B are positioned between two glass sheets and the layered body thus prepared is pressed under increased or reduced pressure and increased temperature to form a laminate.

To laminate the layered body, the methods with which a person skilled in the art is familiar can be used with and without prior production of a pre-laminate.

So called "autoclave processes" are carried out at an increased pressure from approximately 10 to 15 bar and temperatures from 100 to 150° C. during approximately 2 hours. Vacuum bag or vacuum ring methods, for example according to EP 1 235 683 B1, function at approximately 200 mbar and 130 to 145° C.

Vacuum laminators may also be used. These consist of a chamber that can be heated and evacuated, in which laminated glazing can be laminated within 30-60 minutes. Reduced pressures from 0.01 to 300 mbar and temperatures from 100 to 200° C., in particular 130-160° C., have proven their worth in practice.

In the simplest case, in order to produce the laminated glass laminates, film A or B is positioned on a glass sheet, and the further film B or A is positioned synchronously or subsequently. The second glass sheet is then applied and a glass film laminate is produced. Excessive air can then be removed with the aid of any pre-lamination method known to a person skilled in the art. Here, the layers are also already firstly lightly adhesively bonded to one another and to the glass.

The glass film laminate may then be subjected to an autoclave process. Film A is preferably positioned on the first glass sheet and covered by the thicker film B before the second glass sheet is applied. The method can be carried out in many conceivable and, in principle, practicable variants. For example, film A is easily removed from a roll of an appropriate width, whereas film B has been tailor-cut beforehand to the size of the laminated glass to be produced. This is advantageous in particular in the case of windscreens and other automotive glazing parts. In this case, it is particularly advantageous to additionally still stretch the thicker film B before it is tailor cut. This enables a more economical use of film, or, for the case in which film B has a color tint, allows the adaptation of the curvature thereof to the upper sheet edge.

The thin films A are generally produced by extrusion with use of a cast-film line or in the form of a blown film. Here, a surface roughness may also be produced by controlled melt fracture or with the cast-film method additionally by use of a structured chill roll and/or structure back roll. Alternatively, solvent-cast method can be used for producing film A prior to functionalization and use in the described penetration resistant glass laminates. Films used in accordance with the invention preferably have a one-sided surface structure with a roughness Rz from 0 to 25 μm, preferably Rz from 1 to 20 μm, particularly preferably Rz from 3 to 15 μm and in particular Rz from 4 to 12 μm. It is particularly preferable if the side of film A coming into contact with the glass sheet has a surface roughness Rz of no more than 20% of its thickness.

Another aspect of the present invention is a film comprising a polyvinyl acetal PA, optionally at least one plasticiser WA and at least on one surface a region where an ink is applied to the surface wherein prior to its application the pH value of the ink is equal to or higher than 7 and wherein prior to its application the concentration of potassium, magnesium or calcium ions in the ink is equal to or lower than 200 mg/l.

Also disclosed is the use of an ink with a pH value of equal to or higher than 7 and/or a concentration of potassium, magnesium or calcium of equal to or lower than 200 mg/l in a printing or coating process on the surface of a polyvinyl acetal film.

The aspect of the present invention is a method for producing a laminated glass according to the invention as disclosed above characterized in that a region of at least one surface of film A is printed or coated with an ink, then positioned on a first glass sheet, covered by at least one film B, covered by a second glass sheet and then laminated at a temperature equal to or above 100° C.

EXAMPLES

PVB resin powder (commercial grade Mowital® B 60 H of Kuraray Europe GmbH) was fed to the inlet funnel of a lab-extruder of the co-rotating twin screw type. 0.525 w-% relative to the polymer resin of an aqueous solution of potassium acetate and magnesium acetate tetrahydrate was simultaneously dosed into the extruder inlet zone calculated to give rise to 350 ppm potassium acetate respectively 175 magnesium acetate tetrahydrate in the degassed melt. The melt was extruded from a 34 cm wide slit die onto a cooled chill roll to form and subsequently wind thin plasticizer free films in a width of 30 cm with a thickness of about 50 μm (employed and evaluated as film A with ACA)

The films were printed with an opaque black strip as long as the film and 5 cm wide.

Prior to analytical determination of moisture content (Karl-Fischer-Method) and metal content (Ion-Chromatography) the rolls were stored in a conditioned area having a constant climate of 23° C./28% RH.

Commercial automotive grade PVB film with reduced adhesion (TROSIFOL® VG R10 0.76 from Kuraray Europe GmbH=example of film B) was conditioned at the same climate prior to producing the test laminates.

Test laminates in the dimension 30×30 cm were obtained by combining with standard thickness clear glass (2×Planiclear® 2.1 mm) cleaned with deionized water<5 μS on a flat glass washing machine) with the film A and B in the following lay-up orders.

For adhesion test and penetration resistance in combination with automotive grade PVB: bottom glass (air side)—film A—ink layer, where present—VG R10—(tin side) top glass.

The sandwiches were passed through a commercial flat glass laminating nipper-line to produce pre-laminates. Lamination was accomplished by using an autoclave with standard conditions (90 min. comprising 30 min. hold time at 140° C. and 12 bar).

Prior to further mechanical evaluation, laminates were allowed to sit for 1 week at 23° C. ambient conditions.

Penetrations resistance of the laminate structures was tested according ECE 43R (2.26 kg steel ball at 23° C., 226 g steel ball at −20° C. and +40° C.). The laminate configuration (2×2.1 mm) safely passed the requirements as stipulated in ECE R43 for a windshield glazing.

Example 1

The printing was achieved by digital ink-jet printing with commercially available ink-jet inks. To prevent attacking of the ink to the polymer, the color strength of a single printing step was chosen so that a translucent film was achieved. The necessary opaqueness was achieved by over-printing the already printed parts and subsequent drying of the film 22° C. before applying the next layer of printing ink.

COMPARATIVE EXAMPLE

Printing was achieved by using a water-based printing ink that is suitable for flexographic printing, based on poly acrylate as binder and carbon black as pigment. Similar printing inks are commercially available e.g. from Siegwerk Druckfarben AG&Co. KGaA, Siegburg. The ink was analyzed to contain 62 ppm of Calcium, 8 ppm of Magnesium and 12 ppm potassium metal. The black printed layer was overprinted 2 times (3 ink layers in total) in order to arrive at a total dry layer thickness of close to 9 μm with high enough opacity. After drying, the water content of film A in the printed region was measured to be 2%.

As film B, commercial automotive grade PVB film with reduced adhesion (TROSIFOL® VG R10 0.76 from Kuraray Europe GmbH) was used.

Laminates comprising printed films A obtained as described exhibited a nicely defined edge between the clear and the opaque black part. No blurring or deformation of the printed area could be observed. Opacity was measured to be clearly below 5% visible light transmission.

Test for Adhesion

A "pummel test" was used to test the adhesion of the interlayer films to the glass. The test is well-known to the skilled person and described in the literature. Pummel values provided within the scope of the present invention were determined by means of the pummel test as described in WO 03/033583 A1.

When performing the pummel test to assess the adhesion between PVB and inner glass surfaces, the following was observed:

- In the non-printed areas, the interface between glass and VG R10 exhibited an adhesion of 3 Pummel units and the opposite interface between film A and glass an adhesion of 4 Pummel units.
- In the printed area, the interface between glass and VG R10 exhibited an adhesion of 3.5 Pummel units and the opposite interface between film A and glass an adhesion of 0 Pummel units (the glass peeled off in large pieces)

Example 2

Printing was achieved by using a water-based printing ink that is suitable for flexographic printing, based on poly acrylate as binder and carbon black as pigment. For the preparation of this ink composition, deionized water was used instead of the usual city water. The ink was analyzed to contain 3 ppm of Calcium, 1 ppm of Magnesium and 8 ppm potassium metal. The black printed layer was overprinted 2 times (3 ink layers in total) in order to arrive at a total dry layer thickness of close to 9 μm with high enough opacity. After drying, the water content of film A in the printed region was measured to be 2%.

As film B, commercial automotive grade PVB film with reduced adhesion (TROSIFOL® VG R10 0.76 from Kuraray Europe GmbH) was used.

Laminates comprising printed films A obtained as described exhibited a nicely defined edge between the clear and the opaque black part. No blurring or deformation of the printed area could be observed. Opacity was measured to be clearly below 5% visible light transmission.

When performing the pummel test to assess the adhesion between PVB and inner glass surfaces, the following was observed:

In the non-printed areas, the interface between glass and VG R10 exhibited an adhesion of 3 Pummel units and the opposite interface between film A and glass an adhesion of 3.5 Pummel units.

In the printed area, the interface between glass and VG R10 exhibited an adhesion of 3.5 Pummel units and the opposite interface between film A and glass an adhesion of 2.5 Pummel units.

Furthermore, the laminates were subject to a heat soak test at 100° C. during 7 days. Neither the printed nor the non-printed sections exhibited any bubbles or other visible defects. The laminate sample was subject to 3000 h of Xenon testing in a Atlas Ci65 Xenon Weather-Ometer according to ANSI Z97.1-2009 and using the method as specified in ASTM D2565. The laminates were oriented with film A facing the Xenon radiation source. Although the black colour remained largely unchanged after elapse of the 3000 h, tiny bubbles could be observed at the interface of film A and the ink layer. It is speculated that traces of acidity from the ink layer led to partial decomposition of the acid sensitive poly vinyl butyral.

Example 3

Printing was achieved by using a water-based printing ink that is suitable for flexographic printing, based on poly acrylate as binder and carbon black as pigment. For the preparation of this ink composition, deionized water was used instead of the usual city water. The ink was analyzed to contain 3 ppm of Calcium, 1 ppm of Magnesium and 8 ppm potassium metal. In addition the pH value of the ink was controlled to a value of 8.5 via addition of sodium hydroxide. The black printed layer was overprinted 2 times (3 ink layers in total) in order to arrive at a total dry layer thickness of close to 9 μm with high enough opacity. After drying, the water content of film A in the printed region was measured to be 2%.

As film B, commercial automotive grade PVB film with reduced adhesion (TROSIFOL® VG R10 0.76 from Kuraray Europe GmbH) was used.

Laminates comprising printed films A obtained as described exhibited a nicely defined edge between the clear and the opaque black part. No blurring or deformation of the printed area could be observed. Opacity was measured to be clearly below 5% visible light transmission.

When performing the pummel test to assess the adhesion between PVB and inner glass surfaces, the following was observed:

In the non-printed areas, the interface between glass and VG R10 exhibited an adhesion of 3 Pummel units and the opposite interface between film A and glass an adhesion of 3.5 Pummel units.

In the printed area, the interface between glass and VG R10 exhibited an adhesion of 3 Pummel units and the opposite interface between film A and glass an adhesion of 3.5 Pummel units.

Furthermore, the laminates were subject to a heat soak test at 100° C. during 7 days. Neither the printed nor the non-printed sections exhibited any bubbles or other visible defects. The laminate sample was subject to 3000 h of Xenon testing in an Atlas Ci65 Xenon Weather-Ometer according to ANSI Z97.1-2009 and using the method as specified in ASTM D2565. The laminates were oriented with film A facing the Xenon radiation source. The black colour remained largely unchanged after elapse of the 3000 h and no bubbles were observed this time at the interface of film A and the ink layer.

The invention claimed is:

1. A laminated glass, obtained by laminating at least one film A comprising a polyvinyl acetal PA and optionally at least one plasticiser WA between two glass sheets, wherein film A comprises on at least one surface a region where an aqueous ink is applied to the surface wherein prior to its application the pH of the ink is equal to or higher than 7.

2. The laminated glass of claim 1, wherein film A comprises on at least one surface a region where an ink is applied to the surface wherein prior to its application the concentration of potassium, magnesium and calcium ions in the ink is equal to or lower than 200 mg/l.

3. The laminated glass of claim 1, obtained by laminating at least one film A comprising a polyvinyl acetal PA and optionally at least one plasticiser WA and at least one film B comprising a polyvinyl acetal PB and at least one plasticiser WB between two glass sheets wherein the at least one surface of film A, to which the ink is applied, faces film B.

4. The laminated glass of claim 3, wherein, prior to lamination, the amount of plasticiser WA in film A is less than 22% by weight, and the amount of plasticiser WB in film B is at least 22% by weight.

5. The laminated glass of claim 1, wherein prior to lamination, the amount of plasticiser WA in film A is less than 5% by weight.

6. The laminated glass of claim 1, wherein prior to its application, the concentration of potassium, magnesium and calcium ions in the ink is equal to or lower than 200 mg/l.

7. The laminated glass of claim 1, wherein prior to its application, the concentration of potassium, magnesium and calcium ions in the ink is equal to or lower than 100 mg/l.

8. The laminated glass of claim 1, wherein prior to its application, the concentration of potassium, magnesium and calcium ions in the ink is equal to or lower than 50 mg/l.

9. The laminated glass of claim 1, wherein prior to its application the pH of the ink prior to its application is >7.5.

10. The laminated glass of claim 1, wherein prior to its application the pH of the ink prior to its application is >8.0.

11. The laminated glass of claim 1, wherein the laminated glass is non-transparent in the region where the ink is applied to the surface of film A.

12. The laminated glass of claim 1, wherein the laminated glass is colored in the region where the ink is applied to the surface of film A.

13. The laminated glass of claim 1, wherein the ink further contains a water-miscible organic solvent.

14. The laminated glass of claim 1, wherein the aqueous ink has a pH of from 7 to 12.

15. The laminated glass of claim 14, wherein the ink comprises at least one of an alkanol amine, sodium hydroxide, or lithium hydroxide to control the pH of the ink.

16. The laminated glass of claim 1, wherein the ink has a pH of from 8.5 to 10.

17. The laminated glass of claim 1, wherein the ink contains colorants selected from the group consisting of iron oxides, spinels, carbon black, zinc chromate, cadmium sulfide, chromium oxide, ultramarine pigments, metal flakes, barium sulfate, titanium oxide, organic color pigments, dyes, and mixtures thereof.

18. A method for producing a laminated glass of claim 1, comprising printing or coating a region of at least one surface of film A with an aqueous ink having a pH of from 7.5 to 12, then positioning the film A on a first glass sheet, covering the film A by at least one film B, covering film B by a second glass sheet, and then laminating at a temperature equal to or above 100° C.

19. The method of claim 18, wherein film A has a plasticizer WA content of less than 5 weight percent.

* * * * *